US010564630B2

(12) United States Patent
Fujiyama

(10) Patent No.: US 10,564,630 B2
(45) Date of Patent: Feb. 18, 2020

(54) NUMERICAL CONTROLLER

(71) Applicant: FANUC CORPORATION, Minamitsuru-gun, Yamanashi (JP)

(72) Inventor: Jirou Fujiyama, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/008,540

(22) Filed: Jun. 14, 2018

(65) Prior Publication Data

US 2018/0364681 A1 Dec. 20, 2018

(30) Foreign Application Priority Data

Jun. 19, 2017 (JP) .................................. 2017-119941

(51) Int. Cl.
G05B 19/00 (2006.01)
G05B 19/41 (2006.01)
G05B 19/19 (2006.01)

(52) U.S. Cl.
CPC ............. *G05B 19/41* (2013.01); *G05B 19/19* (2013.01); *G05B 2219/42* (2013.01); *G05B 2219/50118* (2013.01)

(58) Field of Classification Search
None
See application file for complete search history.

(56) References Cited

U.S. PATENT DOCUMENTS 5,060,544 A * 10/1991 Hanaki ................ G05B 19/406
82/1.11
6,556,879 B1 4/2003 Matsumoto et al.
2012/0265338 A1* 10/2012 Keibel .................. B25J 9/1674
700/245
2015/0137726 A1 5/2015 Tang
2016/0147213 A1 5/2016 Murakami

FOREIGN PATENT DOCUMENTS

| JP | 62-88546 A | 4/1987 |
|---|---|---|
| JP | S63250709 A | 10/1988 |
| JP | 2000235411 A | 8/2000 |
| JP | 2007188170 A | 7/2007 |
| JP | 2007-249484 A | 9/2007 |
| JP | 2015097045 A | 5/2015 |
| JP | 2016-99824 A | 5/2016 |

OTHER PUBLICATIONS

Decision to Grant a Patent for Japanese Application No. 2017-119941, dated Nov. 27, 2018, with translation, 6 pages.
Chinese Office Action for Chinese Application No. 201810616198. 4, dated Jul. 17, 2019, with translation, 13 pages.

* cited by examiner

*Primary Examiner* — Paul B Yanchus, III
(74) *Attorney, Agent, or Firm* — RatnerPrestia

(57) ABSTRACT

A numerical controller has a tool retraction function for retracting a tool so as not to damage the machined surface of a workpiece when machining of the workpiece by a machine tool is interrupted. The numerical controller identifies a machining method for the machining to be interrupted when a command to interrupt the machining is detected, determines the direction of the retraction of the tool, based on the identified machining method and the feed direction and the rotation direction of a spindle in the machining to be interrupted, and generates a movement path of the tool in the determined retraction direction.

3 Claims, 4 Drawing Sheets

- CASE WHERE WORKPIECE IS ON LEFT SIDE WITH RESPECT TO CUTTING FEED DIRECTION

- CASE WHERE WORKPIECE IS ON RIGHT SIDE WITH RESPECT TO CUTTING FEED DIRECTION

US 10,564,630 B2

NUMERICAL CONTROLLER

CROSS-REFERENCE TO RELATED APPLICATION

This application is a new Patent Application that claims benefit of Japanese Patent Application No. 2017-119941, filed Jun. 19, 2017, the disclosure of this application is being incorporated herein by reference in its entirety for all purposes.

BACKGROUND OF THE INVENTION

Field of the Invention

The present invention relates to a numerical controller, and more particularly, to a numerical controller having a tool retraction function.

Description of the Related Art

In some cases, machining of a workpiece by a machine tool may be interrupted in the middle of the machining due to a power failure or tool change. When a signal that requests a stop is turned on manually or automatically in case the machining is expected to be interrupted, a numerical controller for controlling the machine tool senses the signal and stops a servomotor.

Since a tool and the workpiece are in contact with each other during the machining, if the drive of the motor that drives the machine tool is simply stopped, the machine tool is inevitably stopped with the tool and the workpiece in contact, possibly hindering subsequent operations. In general, therefore, control is required to operate a spindle and the like so as to separate the tool and the workpiece from each other when the machining is interrupted, that is, to retract the tool.

For example, Japanese Patent Application Laid-Open No. 62-88546 discloses a conventional technique for tool retraction control, in which an automatic retraction selection program is run to select Z-axis motion retraction, fixed-path motion retraction, and reverse-path motion retraction for processing if a tool is damaged. Moreover, Japanese Patent Application Laid-Open No. 2016-099824 discloses a technique in which a tool is retracted from a workpiece along a stop retraction path, which combines a path for deceleration stop along a movement path and a retraction path receding from the movement path, when a machining stop signal is sensed. Furthermore, Japanese Patent Application Laid-Open No. 2007-249484 discloses a technique for retracting a tool in its offset vector direction.

However, even if the tool is retracted from the workpiece in the Z-axis direction by using the technique disclosed in Japanese Patent Application Laid-Open No. 62-88546 or if the tool is retracted from the workpiece along the stop retraction path by using the technique disclosed in Japanese Patent Application Laid-Open No. 2016-099824, for example, the surface of the workpiece in contact with the tool may possibly be flawed. For example, if the tool is retracted in the retraction direction (Z-axis direction) shown in FIG. 5 when the stop signal is received while the workpiece is being machined by a milling cutter that performs machining by using a blade on the outer peripheral surface of the rotating tool, as shown in FIG. 5, for example, a contact surface A, one of contact surfaces between the tool and the workpiece, may possibly be flawed longitudinally (or in the tool retraction direction). It is difficult to prevent such damage by only applying the techniques disclosed in Japanese Patent Applications Laid-Open Nos. 62-88546 and 2016-099824.

On the other hand, the tool can be retracted away from the workpiece by using the technique disclosed in Japanese Patent Application Laid-Open No. 2007-249484. Since this technique is premised on the use of a tool offset function, however, it cannot deal with the case where a G-code command for commanding the tool offset direction is not described in a machining program (e.g., a case where the machining program is created based on the consideration of a tool radius offset from the beginning).

In general, in a case where machining is performed using a blade on the outer peripheral surface of a rotating tool such as that shown in FIG. 5, it is desirable to perform axial retraction after radially retracting the tool so that the tool blade leaves the workpiece when the machining is interrupted, as shown in FIG. 6. Since the machining program does not include information on the positional relationship between the tool and the workpiece, however, it is difficult to determine the tool retraction direction based on the positional relationship between the tool and the workpiece.

SUMMARY OF THE INVENTION

Accordingly, the object of the present invention is to provide a numerical controller having a tool retraction function for retracting a tool so as not to damage the machined surface of a workpiece when machining of the workpiece by a machine tool is interrupted.

The numerical controller of the present invention solves the above problems by identifying whether a method for machining the workpiece is down-cut or up-cut when the machining by the machine tool is interrupted and determining the direction of retraction of the tool based on the identified machining method, the direction of cutting feed (advance direction of the tool), and the rotation direction of a spindle.

A numerical controller according to the present invention controls a machine tool which includes a spindle and at least two feed axes for relatively moving the spindle and a workpiece and machines the workpiece by rotating a tool mounted on the spindle in accordance with a machining program. The numerical controller is configured to retract the tool from the workpiece with currently performed machining interrupted, based on a command to interrupt the machining while the workpiece is being machined. And the numerical controller comprises: a stop command detection unit configured to detect the command to interrupt the machining; a machining method identification unit configured to identify a machining method for the machining to be interrupted when the command to interrupt the machining is detected by the stop command detection unit; and a retraction path generation unit configured to determine the direction of the retraction of the tool, based on the machining method identified by the machining method identification unit and the feed direction and the rotation direction of the spindle in the machining to be interrupted, and to generate a movement path of the tool in the determined retraction direction.

The machining method can be either down-cut or up-cut.

The retraction path generation unit may assume, in a case where the machining method is down-cut, a leftward direction relative to the feed direction of the spindle to be the tool retraction direction if the rotation direction of the spindle is clockwise as viewed from the base of the spindle, or assume a rightward direction relative to the spindle feed direction to be the tool retraction direction if the spindle rotation direction is counterclockwise, or assume, in a case where the machining method is up-cut, the rightward direction relative to the spindle feed direction to be the tool retraction direction if the spindle rotation direction is clockwise as viewed from the base of the spindle or assume the leftward direction relative to the spindle feed direction to be the tool retraction direction if the spindle rotation direction is counterclockwise.

According to the present invention, the tool can be retracted from the workpiece lest the surface (machined surface) of the workpiece in contact with the tool be flawed even in case a tool offset or the like is not set in the machining program used in interrupting the machining of the workpiece by the machine tool.

DETAILED DESCRIPTION OF THE PREFERRED EMBODIMENTS

The following is a description of a configuration example of a numerical controller for implementing the present invention. The configuration of the numerical controller of the present invention is not limited to the following example and any configuration may be used provided that it can achieve the object of the invention.

Figure 1:
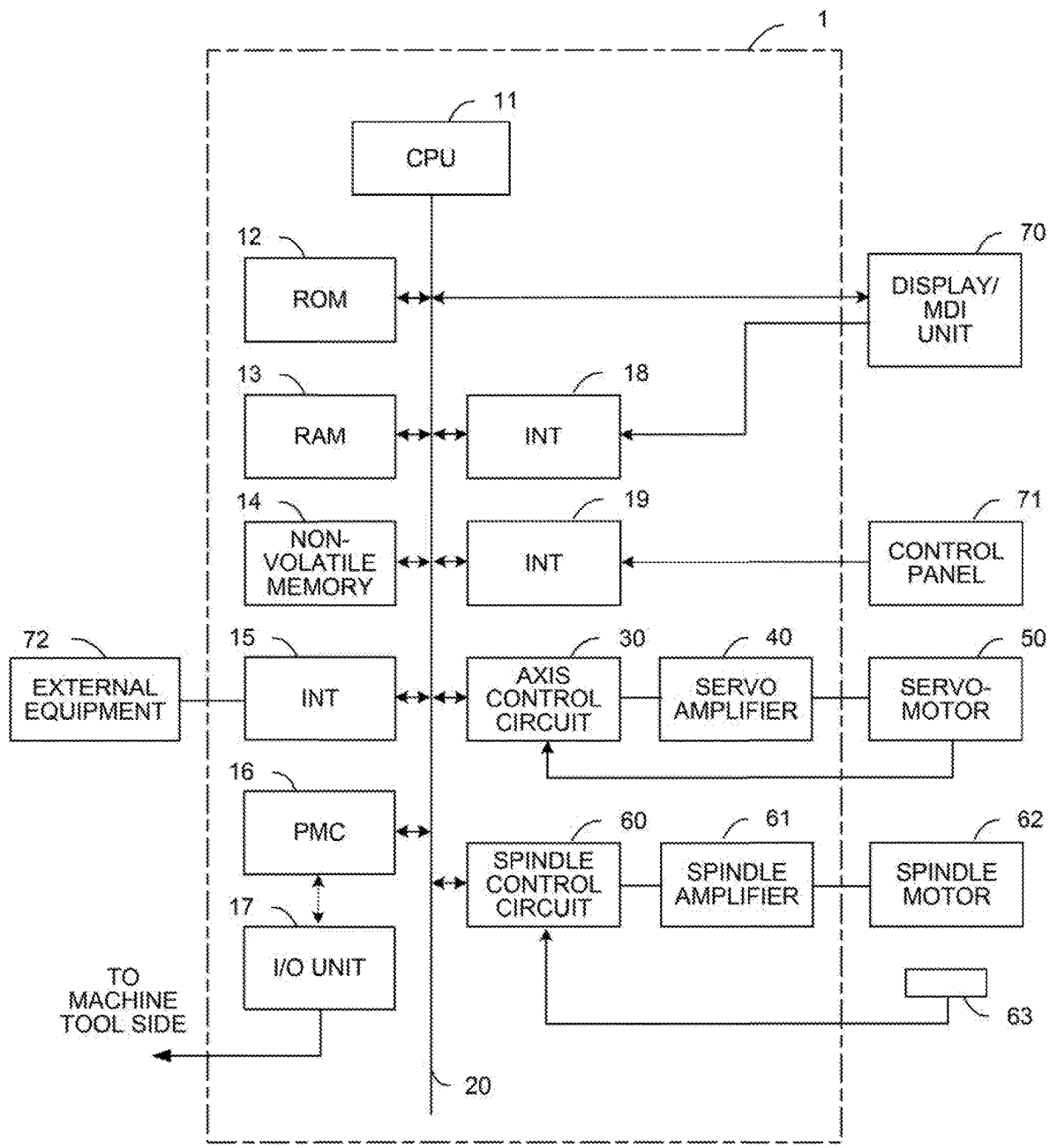
FIG. 1 is a schematic hardware configuration diagram showing principal parts of a numerical controller according to one embodiment and a machine tool controlled by the numerical controller.

FIG. 1 is a schematic hardware configuration diagram showing principal parts of a numerical controller according to one embodiment and a machine tool controlled by the numerical controller.

A CPU 11 of a numerical controller 1 according to the present embodiment is a processor for generally controlling the numerical controller 1. The CPU 11 reads out a system program in a ROM 12 through a bus 20 and controls the entire numerical controller 1 according to the read system program. A RAM 13 is loaded with temporary calculation data and display data, various data input by an operator through a display/MDI unit 70 (described later), and the like.

A non-volatile memory 14 is constructed as a memory that is, for example, backed up by a battery (not shown) so that its storage state can be maintained even when the numerical controller 1 is turned off. The non-volatile memory 14 is stored with a machining program read in through an interface 15, a machining program input through the display/MDI unit 70 (described later), and the like. While the non-volatile memory 14 is further stored with programs for machining program operation processing used to run the machining programs, these stored programs are developed in the RAM 13 at the time of execution. Moreover, various system programs (including a system program for a tool retraction function) for performing edit mode processing and the like needed to create and edit the machining programs are previously written in the ROM 12.

The interface 15 is an interface for connecting the numerical controller 1 and external equipment 72 such as an adapter. The machining programs and various parameters are read in from the side of the external equipment 72. Moreover, the machining programs edited in the numerical controller 1 can be stored in an external storage means through the external equipment 72. A programmable machine controller (PMC) 16 controls peripheral devices (e.g., an actuator such as a robot hand for tool change) of the machine tool by outputting signals to them through an I/O unit 17 according to a sequential program stored in the numerical controller 1. Furthermore, on receiving signals from various switches on a control panel on the main body of the machine tool, the PMC 16 processes the signals as required and delivers them to the CPU 11.

The display/MDI unit 70 is a manual data input unit equipped with a display, keyboard and the like, and an interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling the axes of the machine tool receives a movement command amount of each axis from the CPU 11 and outputs a command for the axis to a servo amplifier 40. On receiving this command, the servo amplifier 40 drives a servomotor 50 for moving the axes of the machine tool. The servomotor 50 for the axes has a position/speed detector built-in, and a position/speed feedback signal from this position/speed detector is fed back to the axis control circuit 30 to perform position and speed feedback control. In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled. In the case of a machining center with three linear axes, for example, the axis control circuit 30, servo amplifier 40, and servomotor 50 are provided corresponding respectively to X-, Y-, and Z-axes as the three linear axes.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a commanded rotational speed, thereby driving a tool.

A position coder 63 is connected to the spindle motor 62. The position coder 63 outputs feedback pulses in synchronization with the rotation of a spindle and the feedback pulses are read by the CPU 11.

Figure 2:
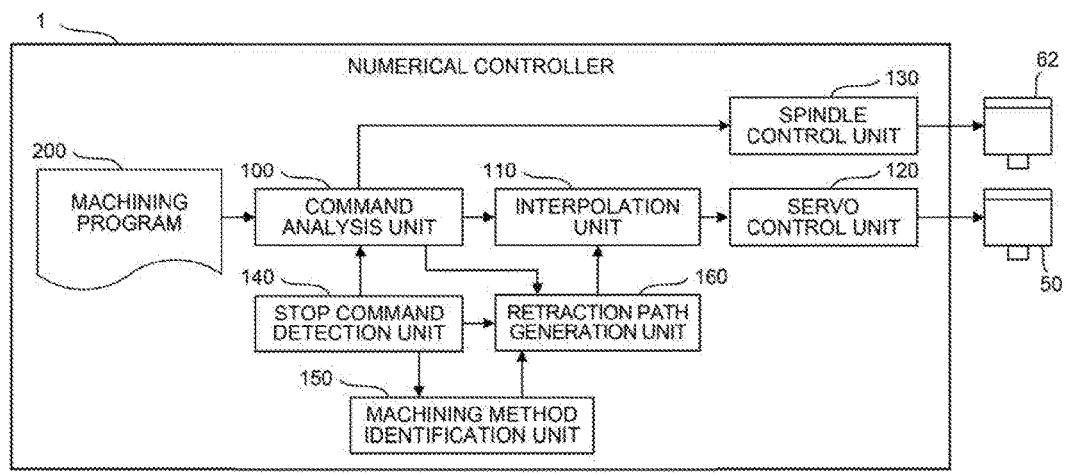
FIG. 2 is a schematic functional block diagram of the numerical controller according to the one embodiment.

FIG. 2 shows a schematic functional block diagram of the numerical controller according to the one embodiment of the present invention in a case where the system program for implementing the tool retraction function is installed in the numerical controller 1 shown in FIG. 1.

Each of functional blocks shown in FIG. 2 can be obtained as the CPU 11 of the numerical controller 1 shown in FIG. 1 executes the system program for the tool retraction function and controls operations of various parts of the numerical controller 1. The numerical controller 1 of the present embodiment comprises a command analysis unit 100, interpolation unit 110, servo control unit 120, spindle control unit 130, stop command detection unit 140, machining method identification unit 150, and retraction path generation unit 160.

The command analysis unit 100 successively reads out command blocks included in a machining program 200, analyzes the read command blocks, and calculates movement command data including a command value F of the feed rate of the spindle and spindle rotation command data including a command value S of the spindle speed. Moreover, on receiving a command from the stop command detection unit 140, the command analysis unit 100 stops the analysis of the machining program 200 (or interrupts machining).

The interpolation unit 110 generates interpolation data obtained by carrying out interpolation calculation on points on a command path commanded by the movement command data in interpolation cycles (or control cycles), based on the command value F of the spindle feed rate calculated by the command analysis unit 100. Interpolation processing by the interpolation unit 110 is performed in each interpolation cycle (or control cycle).

The servo control unit 120 controls the servomotor 50 for controlling the axes of the machine tool to be controlled, based on the interpolation data generated by the interpolation unit 110.

Moreover, the spindle control unit 130 controls the spindle motor 62 for rotating the spindle of the machine tool to be controlled, based on the spindle rotation command data.

The stop command detection unit 140 detects commands (e.g., a stop signal output as the operator operates the control panel 71) to request the interruption of the machining and a tool retraction operation, outputs an interruption command for the currently performed machining to the command analysis unit 100, and also outputs a command for the start of tool retraction control to the machining method identification unit 150 and the retraction path generation unit 160.

On receiving a command from the stop command detection unit 140, the machining method identification unit 150 identifies the machining method for the currently performed machining, that is, the machining to be interrupted. The machining method identification unit 150 identifies whether the machining to be interrupted is down-cut or up-cut with reference to a setting area, which is provided in, for example, the non-volatile memory 14 of the numerical controller and stores setting information on control, and to setting related to a machining method previously set by the operator's operation or in response to a command from a host device (e.g., host computer or cell computer) for process management. When this is done, a single machining method unified for the entire machining program may be set as the setting related to the machining method, or otherwise, different machining methods may be allowed to be set individually for the block ranges or the blocks of the machining program. Moreover, if the setting related to the machining method can be included in the machining program, the machining method identification unit 150 may be configured to read it out of the machining program.

On receiving a command from the stop command detection unit 140, the retraction path generation unit 160 generates a movement command for a retraction direction in which the tool is retracted from a workpiece and outputs it to the interpolation unit 110, based on the machining method (up-cut or down-cut) for the machining to be interrupted, identified by the machining method identification unit 150, and the feed direction of the tool and the rotation direction of the spindle in a movement command for the machining to be interrupted, analyzed by the command analysis unit 100.

Figure 3:
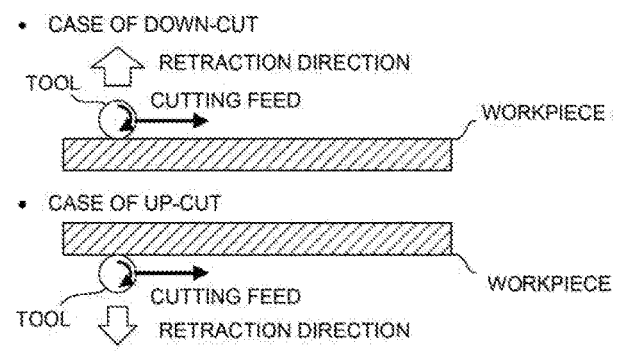
FIG. 3 is a diagram illustrating determination of the direction of retraction of a tool based on a machining method according to the present invention.

FIG. 3 is a diagram illustrating a method for determining the tool retraction direction based on the tool feed direction and the machining method according to the present invention.

If the machining method is down-cut, as shown in FIG. 3, the retraction path generation unit 160 assumes a leftward direction relative to the tool feed direction to be the tool retraction direction when the tool is rotating clockwise as viewed from above it (or from the base of the spindle). In contrast, when the tool is rotating counterclockwise, the retraction path generation unit 160 assumes a rightward direction relative to the tool feed direction to be the tool retraction direction. Moreover, if the machining method is up-cut, the retraction path generation unit 160 assumes the rightward direction relative to the tool feed direction to be the tool retraction direction when the tool is rotating clockwise as viewed from above it (or from the base of the spindle). In contrast, when the tool is rotating counterclockwise, the retraction path generation unit 160 assumes the leftward direction relative to the tool feed direction to be the tool retraction direction.

The amount of movement in the movement command to retract the tool from the workpiece in the retraction direction, which is generated by the retraction path generation unit 160, may be allowed to be previously set in the setting area in the non-volatile memory 14 or the like of the numerical controller 1 by the operator or the host device. Moreover, the retraction path generation unit 160 may be designed to be able to suitably add or synthesize a retraction path created by a conventional technique disclosed in, for example, Japanese Patent Application Laid-Open No. 62-88546 or 2016-099824 to or with the movement command to retract the tool from the workpiece.

Figure 4:
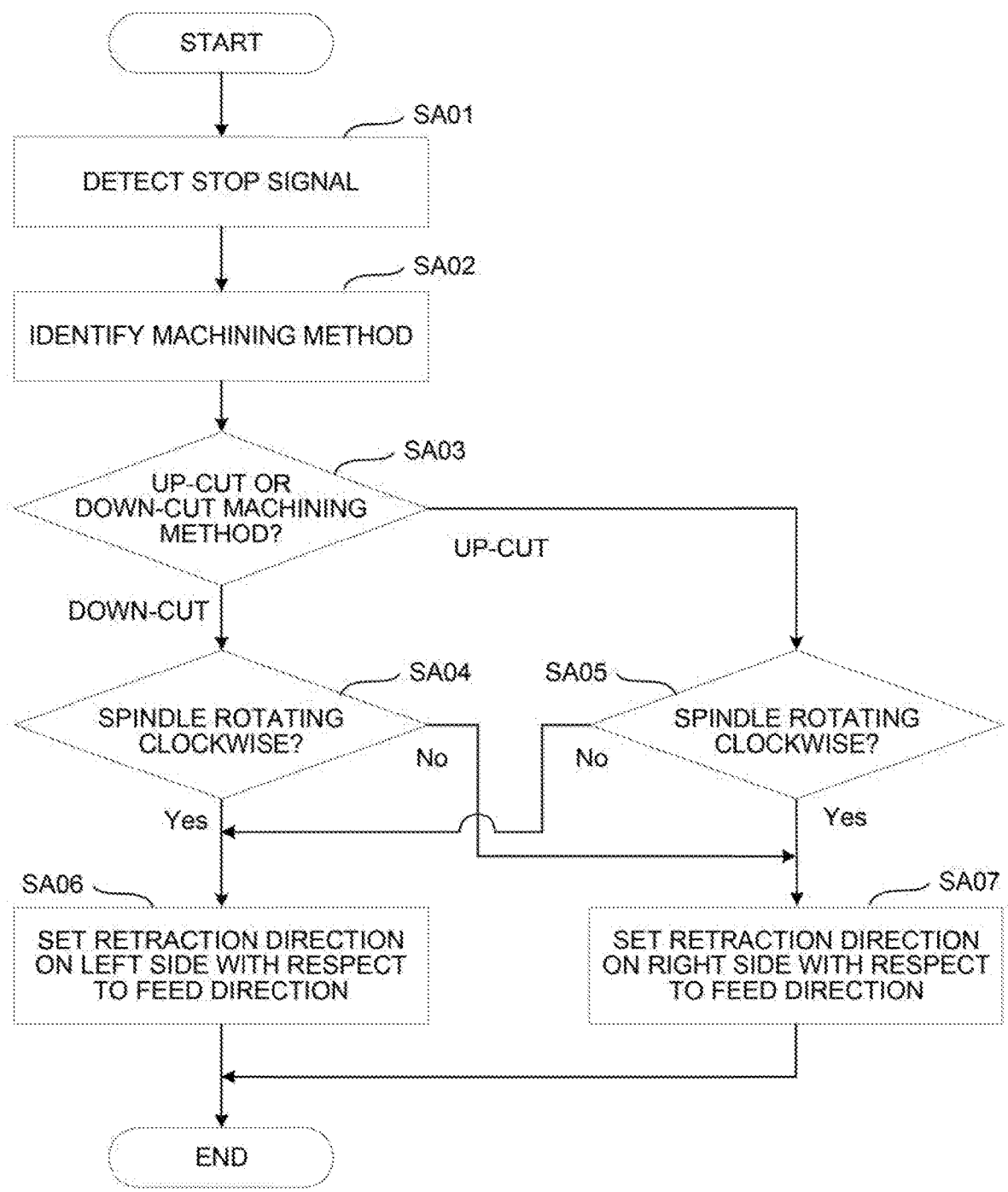
FIG. 4 is a schematic flowchart showing tool retraction processing.
Figure 5:
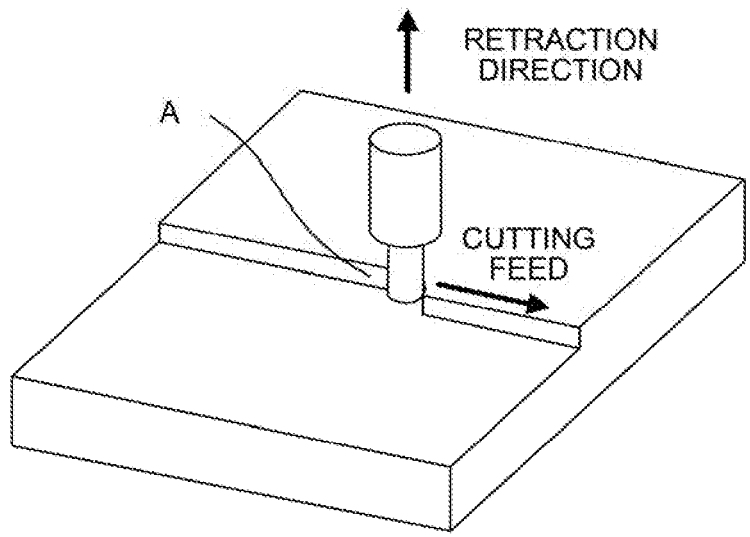
FIG. 5 is a diagram showing an example of machining performed using a blade on the outer peripheral surface of the tool.
Figure 6:
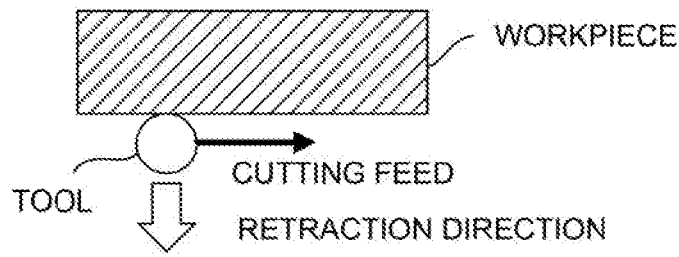
FIG. 6 is a diagram illustrating the direction of retraction of the tool from a workpiece.
Figure 6:
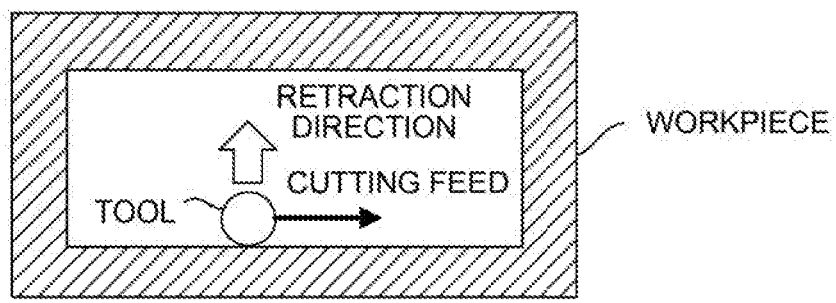

FIG. 4 is a schematic flowchart of processing performed by the stop command detection unit 140, machining method identification unit 150, and retraction path generation unit 160 shown in FIG. 2.

[Step SA01] The stop command detection unit 140 detects the stop signal that requests the interruption of the machining and the tool retraction operation.

[Step SA02] The machining method identification unit 150 identifies the machining method for the machining to be interrupted.

[Step SA03] The retraction path generation unit 160 performs determination based on the type of the machining method identified in Step SA02. If the machining method is down-cut, the processing proceeds to Step SA04. If the machining method is up-cut, the processing proceeds to Step SA05.

[Step SA04] The retraction path generation unit 160 determines the direction in which the tool is rotating as viewed from above it (or from the base of the spindle). If the spindle is rotating clockwise, the processing proceeds to Step SA06. If the spindle is not rotating clockwise (or is rotating counterclockwise), the processing proceeds to Step SA07.

[Step SA05] The retraction path generation unit 160 determines the direction in which the tool is rotating as viewed from above it (or from the base of the spindle). If the spindle is rotating clockwise, the processing proceeds to Step SA07. If the spindle is not rotating clockwise (or is rotating counterclockwise), the processing proceeds to Step SA06.

[Step SA06] The retraction path generation unit 160 determines the tool retraction direction to be leftward with respect to the tool feed direction and thereby generates the retraction path in which the tool is retracted from the workpiece.

[Step SA07] The retraction path generation unit 160 determines the tool retraction direction to be rightward with respect to the tool feed direction and thereby generates the retraction path in which the tool is retracted from the workpiece.

According to the above configuration, the tool can be retracted from the workpiece lest the surface (machined surface) of the workpiece in contact with the tool be flawed even in case a tool offset or the like is not set in the machining program used in interrupting the machining. In particular, the tool can be properly retracted even if a G-code command for commanding the tool offset direction is not used in a machining program created by a machining program creator or if a machining program that does not use any G-code command for commanding the tool offset direction is output depending on the setting and specifications of a CAD/CAM, that is, even in case the machining program is created using a command for which a tool radius is added.

While an embodiment of the present invention has been described herein, the invention is not limited to the above-described embodiment and may be suitably modified and embodied in various forms.

The invention claimed is:

1. A numerical controller controlling a machine tool which includes a spindle and at least two feed axes for relatively moving the spindle and a workpiece and machines the workpiece by rotating a tool mounted on the spindle in accordance with a machining program, wherein the numerical controller is configured to retract the tool from the workpiece with currently performed machining interrupted, based on a command to interrupt the machining while the workpiece is being machined, and wherein the numerical controller comprises:

a processor configured to:

detect the command to interrupt the machining;

identify a machining method for the machining to be interrupted when the command to interrupt the machining is detected; and determine a direction of the retraction of the tool, based on the identified machining method, a cutting feed direction, and rotation direction of the spindle in the machining to be interrupted, and to generate a movement path of the tool in the determined direction of retraction for the tool.

2. The numerical controller according to claim 1, wherein the machining method is either down-cut or up-cut.

3. A numerical controller controlling a machine tool which includes a spindle and at least two feed axes for relatively moving the spindle and a workpiece and machines the workpiece by rotating a tool mounted on the spindle in accordance with a machining program, wherein the numerical controller is configured to retract the tool from the workpiece with currently performed machining interrupted, based on a command to interrupt the machining while the workpiece is being machined, and wherein the numerical controller comprises:

a processor configured to:

detect the command to interrupt the machining;

identify a machining method for the machining to be interrupted when the command to interrupt the machining is detected;

determine a direction of the retraction of the tool, based on the identified machining method, a cutting feed direction, and a rotation direction of the spindle in the machining to be interrupted, and to generate a movement path of the tool in the determined direction of retraction for the tool;

assume, in a case where the machining method is down-cut, a leftward direction relative to the feed direction of the spindle to be the tool retraction direction when the rotation direction of the spindle is clockwise as viewed from a base of the spindle, or assume a rightward direction relative to the spindle feed direction to be the tool retraction direction when the spindle rotation direction is counterclockwise; and assume, in a case where the machining method is up-cut, the rightward direction relative to the spindle feed direction to be the tool retraction direction when the spindle rotation direction is clockwise as viewed from the base of the spindle or assume the leftward direction relative to the spindle feed direction to be the tool retraction direction when the spindle rotation direction is counterclockwise.

* * * * *